United States Patent [19]
Chan et al.

[11] Patent Number: 5,397,928
[45] Date of Patent: Mar. 14, 1995

[54] VOLTAGE TRIPLER USING A CHARGE PUMP HAVING A SINGLE MULTIPLEXED CHARGE TRANSFER CAPACITOR

[75] Inventors: Paul S. Chan, Cupertino; Raymond W. B. Chow, Saratoga, both of Calif.

[73] Assignee: Sipex Corporation, Billerica, Mass.

[21] Appl. No.: 261,754

[22] Filed: Jun. 17, 1994

Related U.S. Application Data

[63] Continuation of Ser. No. 822,397, Jan. 17, 1992, abandoned.

[51] Int. Cl.6 .............................................. H02M 3/18
[52] U.S. Cl. ................................. 307/109; 307/110; 363/60
[58] Field of Search ........................... 307/109–110; 363/60, 59, 61; 321/15

[56] References Cited

U.S. PATENT DOCUMENTS

| | | | |
|---|---|---|---|
| 3,470,443 | 9/1969 | Berry et al. | 321/2 |
| 3,731,112 | 5/1973 | Smith | 307/109 |
| 3,878,450 | 4/1975 | Greatbatch | 321/15 |
| 3,942,047 | 3/1976 | Buchanan | 307/297 |
| 3,943,428 | 3/1976 | Whidden | 321/15 |
| 3,955,353 | 5/1976 | Astle | 58/23 BA |
| 3,975,671 | 8/1976 | Stoll | 321/15 |
| 4,047,091 | 9/1977 | Hutchines et al. | 363/59 |
| 4,061,929 | 12/1977 | Asano | 307/246 |
| 4,068,295 | 1/1978 | Portmann | 363/60 |
| 4,106,086 | 8/1978 | Holbrook et al. | 363/60 |
| 4,186,436 | 1/1980 | Ishiwatari | 363/60 |
| 4,321,661 | 3/1982 | Sano | 363/60 |
| 4,460,952 | 7/1984 | Risinger | 363/61 |
| 4,485,433 | 11/1984 | Topich | 363/60 |
| 4,527,277 | 7/1985 | Kosaka et al. | 375/82 |
| 4,547,682 | 10/1985 | Bialas, Jr. et al. | 307/297 |
| 4,596,963 | 6/1986 | Lawton et al. | 331/14 |
| 4,636,930 | 1/1987 | Bingham et al. | 363/60 |
| 4,679,134 | 7/1987 | Bingham et al. | 363/61 |
| 4,736,167 | 4/1988 | Kojima et al. | 331/17 |
| 4,745,372 | 5/1988 | Miwa | 331/8 |
| 4,750,193 | 6/1988 | Bailey | 375/81 |
| 4,766,397 | 8/1988 | Adams | 331/1 A |
| 4,777,577 | 10/1988 | Bingham et al. | 363/60 |
| 4,797,899 | 1/1989 | Fuller et al. | 375/7 |
| 4,809,152 | 2/1989 | Bingham et al. | 363/61 |
| 4,829,391 | 5/1989 | Vargas, Jr. | 360/51 |
| 4,871,979 | 10/1989 | Shearer et al. | 330/253 |
| 4,897,774 | 1/1990 | Bingham et al. | 363/61 |
| 4,914,695 | 4/1990 | Martin | 380/7 |
| 4,922,141 | 5/1990 | Lofgren et al. | 307/595 |
| 4,970,472 | 11/1990 | Kennedy et al. | 331/8 |
| 4,970,475 | 11/1990 | Gillig | 331/25 |
| 4,999,761 | 3/1991 | Bingham et al. | 363/60 |
| 5,003,197 | 3/1991 | Nojima et al. | 307/296.2 |
| 5,008,629 | 4/1991 | Ohba et al. | 328/14 |
| 5,043,686 | 8/1991 | Plunkett | 333/181 |
| 5,095,223 | 3/1992 | Thomas | 307/110 |

OTHER PUBLICATIONS

Wakeman, Larry, "National's Process Enhancements Eliminate the CMOS SCR Latch-Up Problem in 56HC/74 HC Logic," *National Semiconductor Application Note 339*, pp. 2–43 through 2–50, undated.

*Primary Examiner*—A. D. Pellinen
*Assistant Examiner*—Aditya Krishnan
*Attorney, Agent, or Firm*—Weingarten, Schurgin, Gagnebin & Hayes

[57] ABSTRACT

A voltage tripler which uses a charge pump with a single charge transfer capacitor to produce the required voltage is disclosed. The voltage tripler in conjunction with an inverter is useful for producing voltages with negative polarities. The voltage tripler when used in conjunction with a variable frequency oscillator circuit is useful in optimizing the power consumption by the charge pump of the voltage tripler when the tripler is not operating under load conditions. The tripler is useful in supplying power to a combination RS232 and RS422 or RS232 and RS485 interface, as well as other monolithic interface products.

19 Claims, 6 Drawing Sheets

VOLTAGE TRIPLER USING A CHARGE PUMP HAVING A SINGLE MULTIPLEXED CHARGE TRANSFER CAPACITOR

This application is a continuation of U.S. patent application Ser. No. 07/822,397, filed Jan. 17, 1992, now abandoned.

FIELD OF THE INVENTION

The invention relates to the field of computer interface devices and more particularly to the field of comuter interface devices having a voltage tripler and a power conservation circuit.

BACKGROUND OF THE INVENTION

Data is transmitted from and received by a computer by way of a communications interface. A communications interface standard defines both the physical connections which are made to a communications interface and the electrical characteristics of the signals which are transmittable and receivable by the communications interface. Two communications standards which are frequently used are the Electronic 1.3 Industries Association (EIA) RS232 and RS422 standards. Since the RS232 and RS422 interface standards define communications interfaces having different electrical requirements, the placement of RS232 and RS422 functionality in the same integrated circuit chip requires that power be supplied to meet the different voltage and current needs of the interface.

One way to provide the positive and negative voltage levels required by the RS232 and RS422 portions of the integrated circuit chip is to generate the various voltage levels from a single supply voltage by using a voltage multiplier. Voltage multipliers typically are used to increase the voltage supplied from a fixed voltage power supply by a predetermined factor. Voltage conversion may be achieved by utilizing a series of capacitors which are selectively and sequentially charged and discharged to higher intermediate voltages until the desired voltage is reached. Typically such voltage multipliers known to the art have used two charge transfer capacitors in a charge pump arrangement in which one charge transfer capacitor is charged to provide double the supply voltage and the second charge transfer capacitor is charged to provide triple the supply voltage.

One disadvantage of such this charge pump voltage multiplying circuit is that although most of the circuit is fabricated on a single integrated circuit chip, the charge transfer capacitors are typically large devices which must externally be connected to the integrated circuit chip. The use of multiple external charge transfer capacitors not only increases the number of discrete components in the system, but also utilizes circuit board space which could be otherwise used. As the component density of the circuit board increases, space on the board becomes expensive and a reduction in the discrete component count becomes desirable. Additionally, where the charge transfer capacitors are included within the integrated circuit, it is likewise disadvantageous to employ multiple charge transfer capacitors.

Additionally, charge pumps typically consume power during the voltage tripling process in a manner that is independent of whether or not a load is being supplied with current by the voltage tripler. Such wasteful power consumption becomes an important consideration when a portable power supply is providing the source voltage.

The present invention reduces the number of external charge transfer capacitors and hence both decreases the number of discrete components and saves circuit board space. Additionally, the present invention also optimizes power consumption by detecting the presence of a load and appropriately adjusting the power consumed.

SUMMARY OF THE INVENTION

The invention relates to a novel circuit for voltage tripling which uses a charge pump with a single charge transfer capacitor to generate a requisite voltage level. The single charge transfer capacitor is multiplexed in a manner which permits the single capacitor first to be used to double the input voltage and then to be used again to triple the input voltage.

One advantage of the voltage tripler circuit is that the voltage tripler circuit may be fabricated as an integrated circuit with a reduced number of pins used to communicate with external capacitors. The use of the single charge transfer capacitor rather than multiple charge transfer capacitors to double the voltage and triple the voltage not only decreases the number of external components in the circuit but also saves circuit board space.

In another embodiment, the voltage tripler circuit which uses a single charge transfer capacitor to generate the requisite voltage level is used in conjunction with an inverter to provide a negative and tripled inverted voltage.

In yet another embodiment, the voltage tripler circuit which uses a single charge transfer capacitor to generate the requisite voltage level is used with a variable frequency oscillator and controller so as to conserve power when the voltage tripler circuit is not under load.

This invention is especially useful in combination with combination RS232 and RS422 or RS232 and RS485 interfaces as well as other interface products requiring bipolar supply voltages. This is especially true in applications requiring low power consumption, such as those whose power is supplied by a battery.

BRIEF DESCRIPTION OF THE DRAWING

These and other features and advantages of the invention will be more readily understood in view of the accompanying specification and drawing in which.

DESCRIPTION OF THE PREFERRED EMBODIMENT

Figure 1:
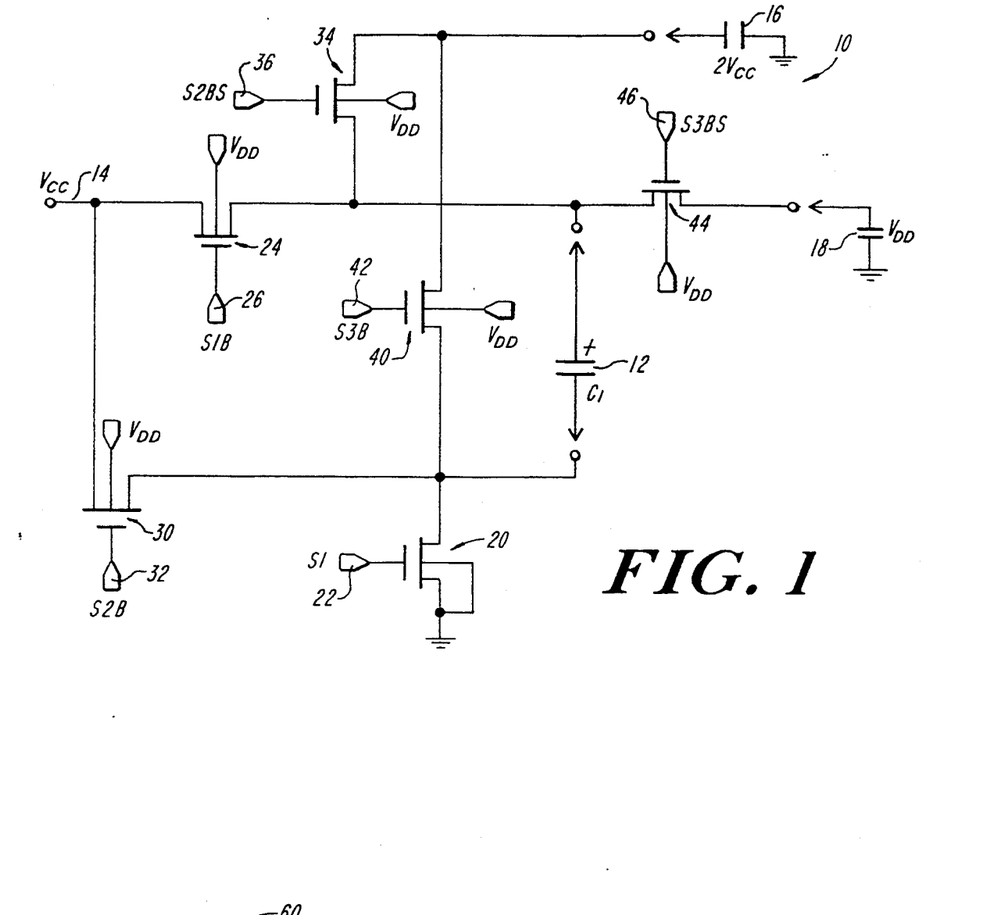
FIG. 1 is a schematic diagram showing an embodiment of the voltage tripler presently disclosed.

Referring to FIG. 1, in brief overview, a voltage tripler circuit 10 having a charge pump includes a single charge transfer capacitor 12 which is used to provide an output voltage which is three times the supply voltage 14. To do this, the charge transfer capacitor 12 is multiplexed first to generate a voltage which is twice the supply voltage and second to generate a voltage which is three times the supply voltage.

In more detail, a first terminal of the charge transfer capacitor 12 is in communication with: the supply voltage 14 through a FET transistor acting as a switch 24; a triple voltage storage capacitor 18 through a FET transistor acting as a switch 44; and a double voltage storage capacitor 16 through a FET transistor acting as a switch 34. Likewise, the other terminal of the charge transfer capacitor 12 is in communication with: the supply voltage 14 through a FET transistor acting as a switch 30; ground through a FET transistor acting as a switch 20; and the double voltage storage capacitor 16 through a FET transistor acting as a switch 40. By selectively turning on the switches in a predetermined order, the desired triple voltage may be obtained.

Figure 2:
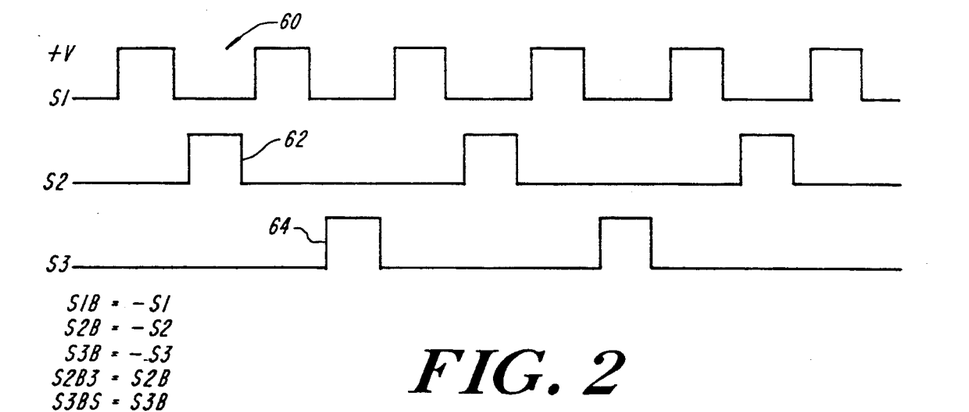
FIG. 2 is a timing diagram showing the various timing signals used in the embodiment of the voltage tripler shown in FIG. 1.

To understand the voltage tripler circuit 10, it is best to consider how the voltage tripler circuit 10 functions. Considering FIG. 2 in conjunction with FIG. 1; FIG. 2 depicts the timing diagrams of the waveforms which, when applied to the gates of the various FET transistors, control the turning on of switches 20, 24, 30, 34, 40 and 44 shown in FIG. 1. For clarity, only three waveforms S1 60, S2 62, and S3 64 are shown in FIG. 2. Waveform S1 60 controls the turning on and off of switch 20, while waveform S1B (not shown, but having the same timing as S1 60 but with inverted polarity with respect to S1 60) controls switch 24. Similarly, waveforms S2B and S3B (not shown, but having the same timing but inverted polarity as S2 62 and S3 64, respectively) control switches 30 and 40, respectively, while waveforms S2BS and S3BS (not shown, but having the same timing and polarity as waveforms S2B and S3B) control switches 34 and 44, respectively.

In operation, the invention makes use of a four cycle clock to generate the requisite waveforms, which will be described in more detail below. With all switches 20, 24, 30, 34, 40 and 44 initially off, the positive high portion of waveform S1 60, and the negative high portion of waveform S1B applied to the gates 22 and 26, respectively, turn on switches 20 and 24 thereby connecting the first terminal of charge transfer capacitor C1 12 to the power supply 14 ($V_{cc}$) and connecting the other terminal of charge transfer capacitor C1 12 to ground. This charges capacitor C1 12 to the supply voltage 12 ($V_{cc}$).

On the next cycle, the low portion of waveforms S1 60 and S1B turns off switches 20 and 24 and the high portion of waveforms S2B 62 and S2BS, applied to gates 32 and 36, respectively, turn on switches 30 and 34, respectively. The turning on of switch 30 connects the second, previously grounded, terminal of charge transfer capacitor 12 to the power supply 12 ($V_{cc}$) and the turning on of switch 34 connects the first terminal of charge transfer capacitor 12 to a double voltage storage capacitor 16. The connecting of the previously grounded terminal of the capacitor 12 to the power supply 12 ($V_{cc}$) causes the voltage on that terminal to rise to $V_{cc}$ and thereby causes the first terminal of the charge transfer capacitor to rise to double the supply voltage (2 $V_{cc}$). This charges the double voltage storage capacitor 16 to 2 $V_{cc}$.

On the third cycle, switches 30 and 34 are again turned off and the waveform S1 60 and S1B again turns on switches 20 and 24, respectively when such waveform is high, again charging the charge transfer capacitor C1 12 to the supply voltage 14 ($V_{cc}$).

On the fourth cycle, switches 20 and 24 are again turned off and the high portions of waveforms S3B 64 and S3BS (not shown but having the same timing and polarity as S3B 64), applied to gates 42 and 46, respectively, turn on switches 40 and 44, respectively. The connection of the second, previously grounded, terminal of C1 12 to the double voltage storage capacitor 16 at a potential of 2 $V_{cc}$ causes the voltage on the first terminal of the charge transfer capacitor 12 to rise to 3 $V_{cc}$ and hence charge a triple voltage storage capacitor 18 to 3 $V_{cc}$. Therefore, the voltage on the triple voltage storage capacitor 18 has been raised to triple the supply voltage using a single charge transfer capacitor 12. It should be noted that charge transfer capacitor 12 may be fabricated within the same integrated circuit chip containing the voltage tripler circuit 10.

Figure 3:
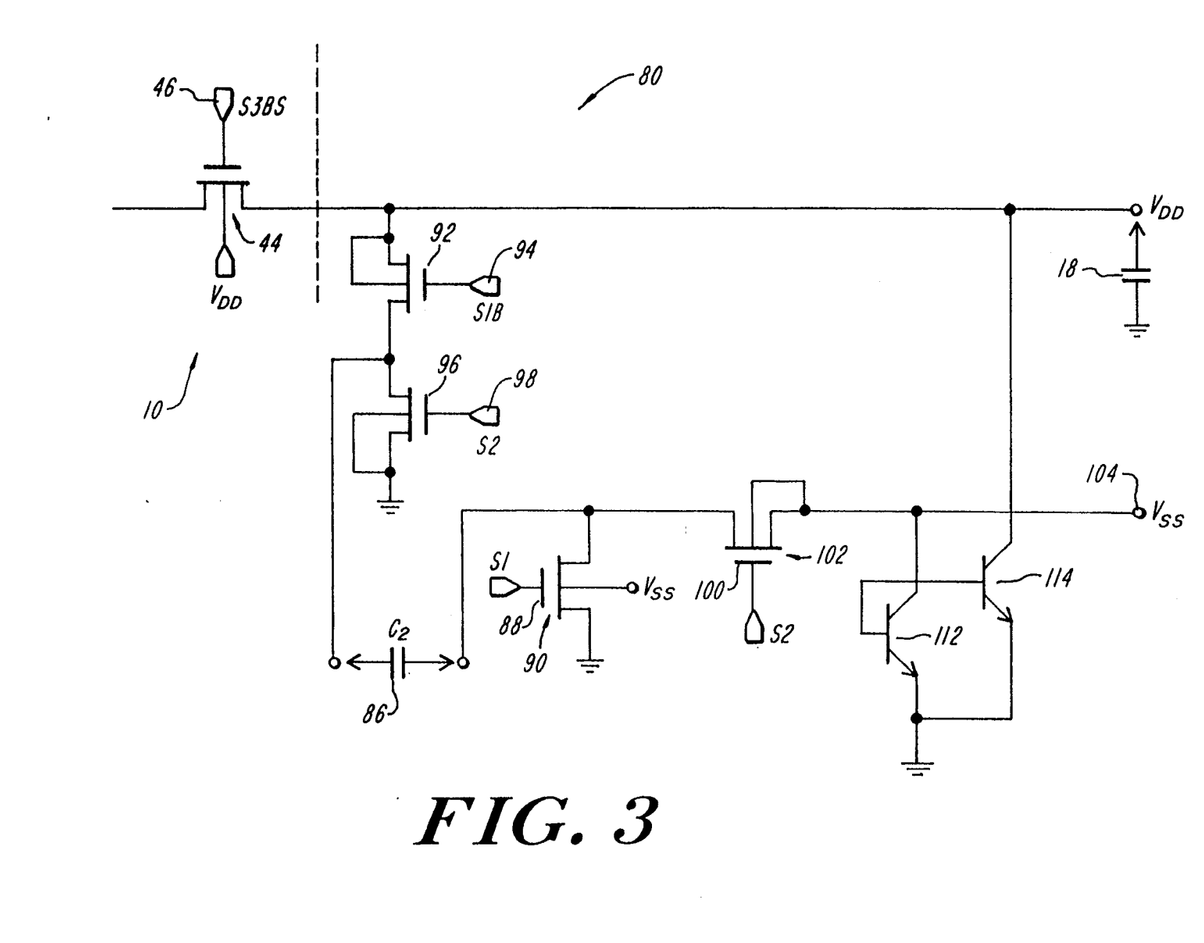
FIG. 3 is a schematic diagram of an embodiment of an inverter which may be used in conjunction with the embodiment of the voltage tripler shown in FIG. 1.

Referring to FIG. 3, an inverter 80 which may be used with the voltage tripler circuit 10 having a single charge transfer capacitor 12 is connected to the voltage tripler circuit 10 through switch 44. In operation, the inverter makes use of the same signals from the four cycle clock which is used by the voltage tripler circuit 10.

Starting with the fourth clock cycle in the voltage tripling operation as just described, and with all the switches 90, 94, 98, and 102 in the inverter 80 initially off, the high portion of waveform S3BS (not shown), applied to gate 46, turns on switch 44 charging the triple voltage storage capacitor 18 to 3 $V_{cc}$.

On the next clock cycle, switch 44 turns off and the positive high portion of waveform S1 60 and the negative high portion of waveform S1B (not shown) applied to the gates 88 and 92, respectively, turn on switches 90 and 94. The turning on of switch 94 connects the first terminal of the inverter capacitor C2 86 to the high voltage terminal of the triple voltage storage capacitor 18. The turning on of switch 90 connects the other terminal of inverter capacitor C2 86 to ground. This charges inverter capacitor C2 86 to the voltage 3 $V_{cc}$ which is on capacitor 18.

On the next cycle, the low portion of waveforms S1 60 and S1B (not shown) turns off switches 90 and 94 disconnecting inverter capacitor C2 86 from capacitor 18 and from ground. The high portion of waveform S2 (not shown, but having the same timing and polarity as waveforms S2B and S3B), applied to gates 96 and 100 turns on switches 98 and 102, respectively. The turning on of switch 102 connects the second, previously grounded, terminal of the inverter capacitor C2 86 to the output terminal Vss 104. The turning on of switch 98 connects the first, previously high voltage, terminal of the inverter capacitor C2 86 to ground. The connecting of the previously grounded terminal of the capacitor C2 86 to the output terminal Vss 104 and the grounding of the previously high voltage terminal of the capacitor C2 86, causes the voltage on the output terminal 104 to fall to $-V_{DD}$ or $-3 V_{cc}$ relative to ground.

On the third cycle, switches 98 and 100 are again turned off and the high portions of waveforms S1 60 and S1B again turn on switches 90 and 94, respectively. This again connects the inverter capacitor C2 86 to the triple voltage capacitor 18 and the cycle is then repeated.

Thus, the addition of the inverter permits the voltage tripler 10 to be used to supply a voltage equal to minus three times the positive supply voltage. It should also be noted that in the embodiment shown, two transistors, 112 (acting as a diode) and 114 are included at the output terminal to prevent latch-up. Latch-up, a common problem with CMOS devices, may also be avoided in the inverter by several other methods known to those skilled in the art. For example, both Bingham, U.S. Pat. No. 4,999,761 and the National Semiconductor High Speed microCMOS Logic Family Databook application note AN-339 detail approaches for avoiding latch-up.

Figure 4:
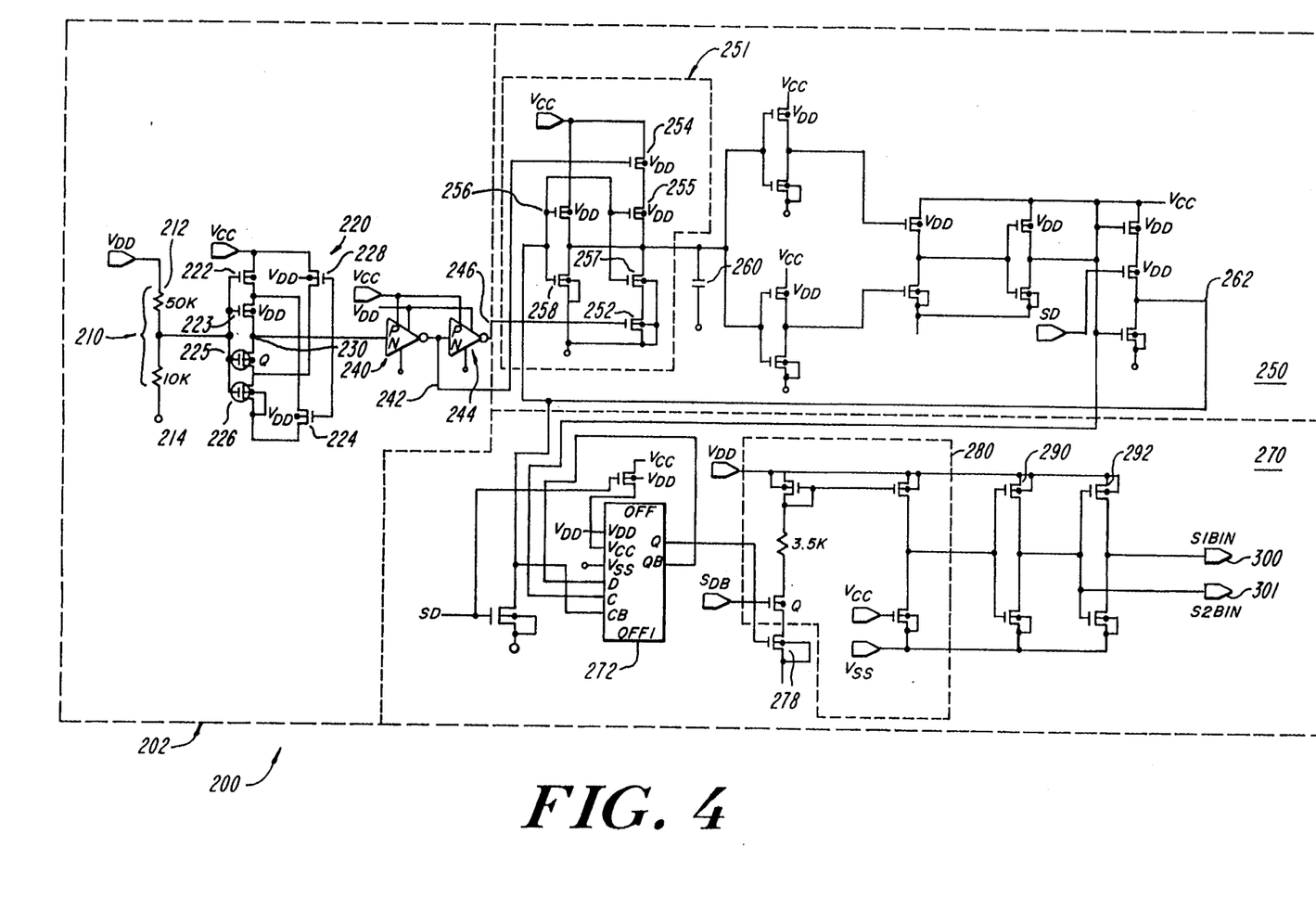
FIG. 4 is a schematic diagram of an embodiment of a power management circuit which may be used with the embodiment of the voltage tripler shown in FIG. 1.

A power management circuit 200 which may be used to vary the clock frequency supplied to the voltage tripler 10 thereby to optimize power consumption in the voltage tripler 10 is shown in FIG. 4. The power management circuit 200 includes a frequency controller 202, an oscillator 250 and a voltage conditioning circuit 270. The purpose of the power management circuit 200 is to vary the oscillator frequency and hence the clock frequency at which the charge pump of the voltage tripler 10 is operating. Briefly, as the voltage level $V_{DD}$ at the output terminal of the tripler 10 decreases, for example, because of loading, the frequency controller 202 detects the drop in the voltage level $V_{DD}$ and instructs the oscillator 250 to increase the output frequency to compensate for the voltage drop. As $V_{DD}$ increases above the prescribed voltage, the frequency controller 202 instructs the oscillator 250 to decrease the output frequency. In this manner, the power consumed by the voltage tripler 10 is matched to that required by the load.

Specifically, the frequency controller 202 includes a voltage divider 210 having resistors 212 and 214. In the embodiment shown, the divider produces a five to one reduction in voltage. The divided down voltage $V_{DD}$ controls the gates of two p channel MOSFET transistors 222, 223 and two n channel MOSFET transistors 225, 226 which form a hysteresis generator and level detector 220.

When $V_{DD}$ falls below a predetermined value (in this embodiment about seven volts) the divided down voltage causes the p channel MOSFET transistors 222, 223 to become more conductive and the n channel MOSFET transistors 225, 226 to turn off. This results in nodal point 230 being connected to $V_{cc}$. The voltage of the nodal point 230 then rises to approximately $V_{cc}$ (logic level one). Conversely, when $V_{DD}$ rises above a predetermined value the divided down voltage rises also and causes the p channel MOSFET transistors 222, 223 to become less conductive and the n channel MOSFET transistors 225, 226 to turn on. This connects nodal point 230 to ground causing its voltage level to fall to ground (logic level zero).

To prevent the frequency controller 202 from hunting about $V_{DD}$, voltage hysteresis is introduced into the circuit by the combination of p channel MOSFET transistor 224 and n channel MOSFET transistor 228. The amount of off-voltage hysteresis, which prevents the frequency controller 202 from causing the oscillator 250 to switch to high frequency immediately as $V_{DD}$ falls below the predetermined voltage, is set by the ratio of p channel MOSFET transistor 224 and p channel MOSFET transistor 222. Similarly, the amount of on-voltage hysteresis, which prevents the frequency controller 202 from causing the oscillator to switch immediately to low frequency as $V_{DD}$ rises above the predetermined voltage, is determined by the ratio of n channel MOSFET transistor 228 and n channel MOSFET transistor 226.

The voltage at nodal point 230 is an input voltage to an inverter 240 whose output 242 is both the NOT-high-frequency-enable signal and the input signal to a second inverter 244. The output 246 of the second inverter 244 is the high-frequency-enable signal. The NOT-high-frequency-enable signal and the high-frequency-enable signal control the gates of FET transistors 252 and 254, respectively.

FET transistors 252, 254, 255, 256, 257, and 258 form a network 251 which controls the rate of charging and discharging of capacitor 260. Capacitor 260 is connected to $V_{cc}$ through FET transistors 254, 255, and 256. The capacitor 260 is connected to ground through FET transistor 252, 257, and 258. FET transistors 255, 256 are p channel MOSFET transistors, while FET transistors 257, 258 are n channel MOSFET transistors. The signal from the output terminal 262 of the oscillator 250 controls the gates of the network 251 so as to permit capacitor 260 to charge and discharge. When the signal on the output terminal 262 is at ground, FET transistor 256 is on, connecting capacitor 260 to $V_{cc}$ and permitting capacitor 260 to charge to $V_{cc}$. FET transistors 257 and 258 are off, isolating the capacitor 260 from ground. The turning on of FET transistor 256 causes the output terminal 262 of the oscillator 250 to go high (logic one).

This high output signal turns off FET transistors 255 and 256 and turns on FET transistors 257 and 258. The turning off of FET transistor 256, isolates the capacitor 260 from $V_{cc}$, while the turning on of FET transistor 258 connects the capacitor 260 to ground, causing it to discharge. The discharge of capacitor 260 causes the output terminal 262 of the oscillator 250 to go to low (logic zero), thereby repeating the cycle. The rate at which the cycle repeats and hence rate at which the oscillator oscillates is determined capacitance of the capacitor 260 and the resistances of the charging FET transistor 256 and the discharging FET transistor 258.

FET transistor 252, whose gate is connected to the high-frequency-enable output 246 of the second inverter 244, provides a second pathway, from the capacitor 260 through FET transistor 257 to ground. Likewise, FET transistor 254, whose gate is connected to the NOT-high-frequency-enable output 242 of the first inverter 240, provides a second pathway, from the capacitor 260 through FET transistor 255 to $V_{cc}$.

Therefore, when the controller 202 detects a low $V_{DD}$ and enables the high frequency operation of the oscillator 250, the NOT-high-frequency-enable signal applied to the gate of FET transistor 254, and the high-frequency-enable signal applied to the gate of FET transistor 252, turn on FET transistors 254 and 252, respectively. With FET transistor 254 on, a second, lower resistance path is available from the capacitor 260 to $V_{cc}$; FET transistor 254 being a larger device than FET transistor 256. Thus when FET transistors 255, 256 turn on as previously described, the capacitor 260 is charged more quickly than when only charged through FET transistor 256.

Similarly, when FET transistor 252 is on, a second, lower resistance path is available from the capacitor 260 to ground; FET transistor 252 being a larger device than FET transistor 258. Thus when FET transistors 257, 258 turn on as previously described, the capacitor 260 is discharged more quickly than when only discharged through FET transistor 258. It is the combination of more rapid charging and discharging that produces a higher frequency oscillation.

Figure 5:
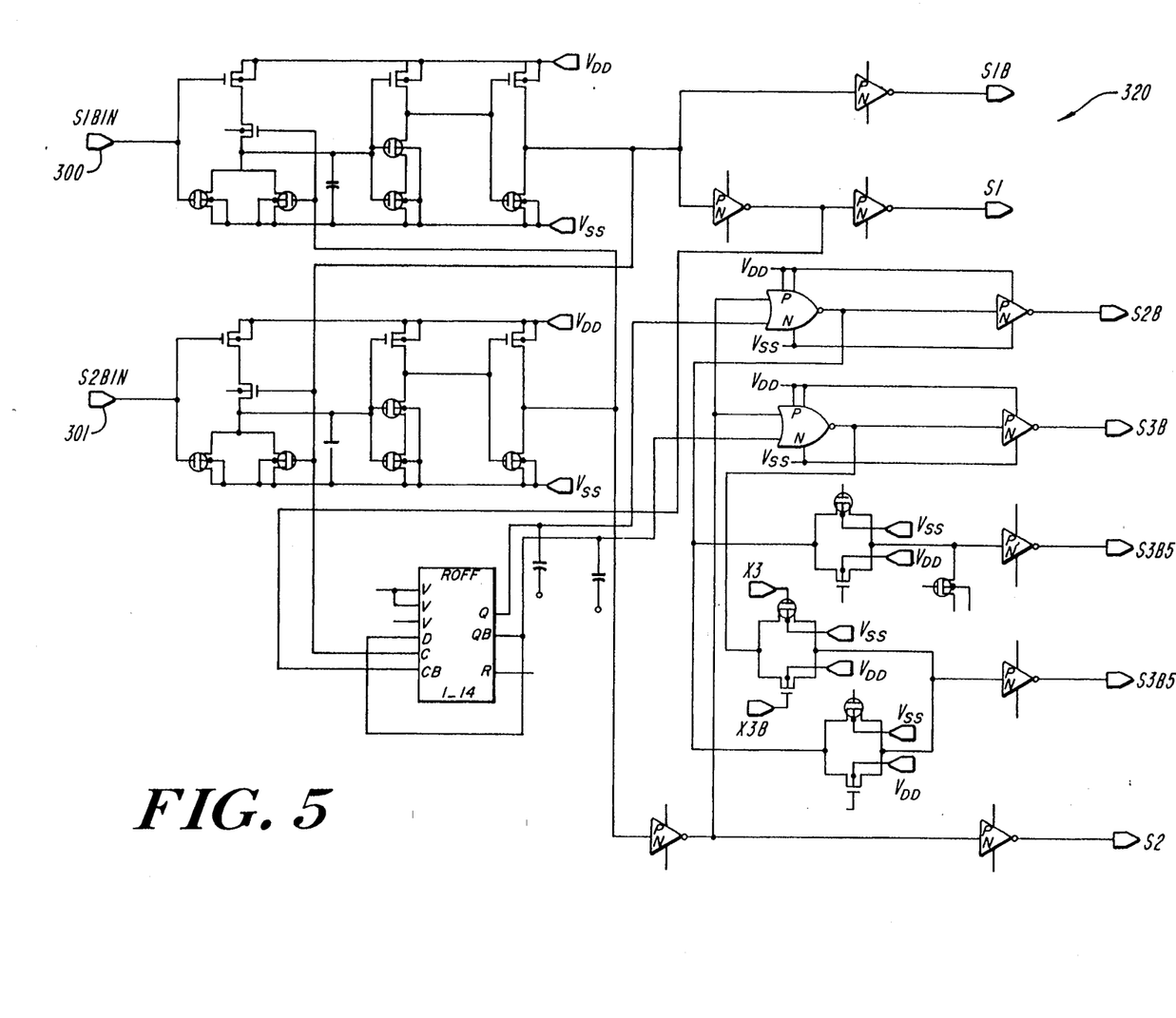
FIG. 5 is a schematic diagram of an embodiment of a multi-phase clock which receives timing signals from the embodiment of the power management circuit shown in FIG. 4, and generates the clock signals for the embodiment of the inverter shown in FIG. 3 and for the embodiment of the voltage tripler shown in FIG. 1.

The signal from the output terminal 262 of the oscillator 250 is the input signal to signal conditioning circuit 270, including a flip flop 272, a level shifter 278, a phase shifter 280 and two buffer stages 290, 292. The output signal the oscillator 250 is the input signal to the D-flip flop 272 which is connected so as to divide the output signal frequency from the oscillator 250 by two. This provides a fifty percent duty cycle. The output signal from the D-flip flop 272 is used to control the gate of a FET transistor used as the level shifter 278. The level shifted signal from FET transistor is the input signal to the phase shifter 280. The output signal from the phase shifter 280 is used to control the gates of a group of FET transistors configured as two buffer stages 290, 292. The output terminals 300, 301 of the buffer stages 290, 292 provide the oscillator timing signals, S1BIN 200 and S2BIN 301, to a four phase clock 320, an embodiment of which is shown in FIG. 5. The four phase clock 320 shown provides the various clock signals used by the voltage tripler 10 and inverter 80 of the invention.

Figure 6:
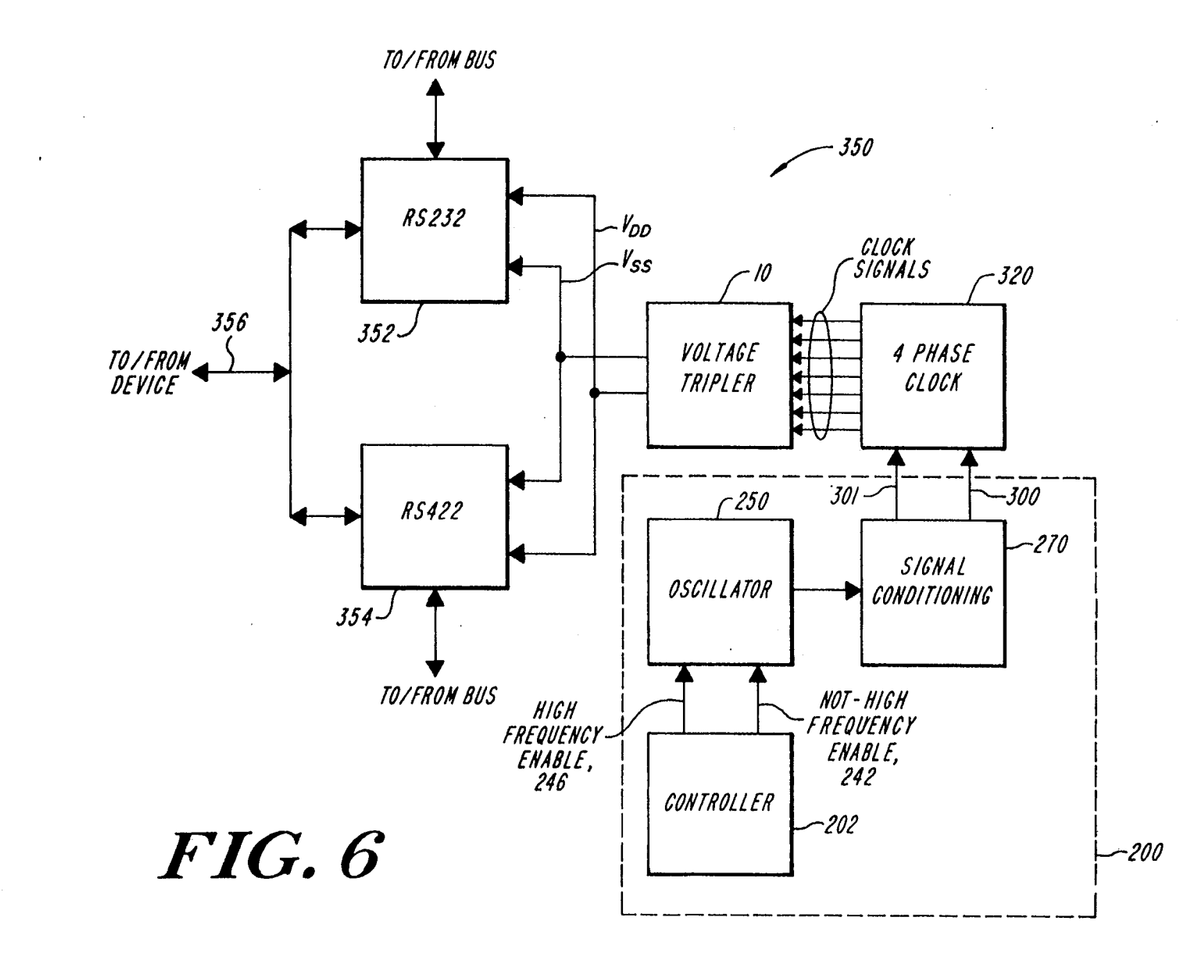
FIG. 6 is a block diagram of a combination RS232/RS422 driver utilizing the embodiment of the voltage tripler circuit shown in FIG. 1.

FIG. 6 depicts the voltage tripler 10, the four phase clock 320, the power management circuit 200 used in a combined RS232 352 and RS422 354 interface. The interfaces 352, 354 receive signals from the computer bus (not shown) and transfer the correct signals through a common terminal 356. The proper voltages are supplied to each of the drivers of the interface using the voltage tripler 10, inverter 80, four phase clock 320 and power management circuitry 200 herein described.

Figure 7:
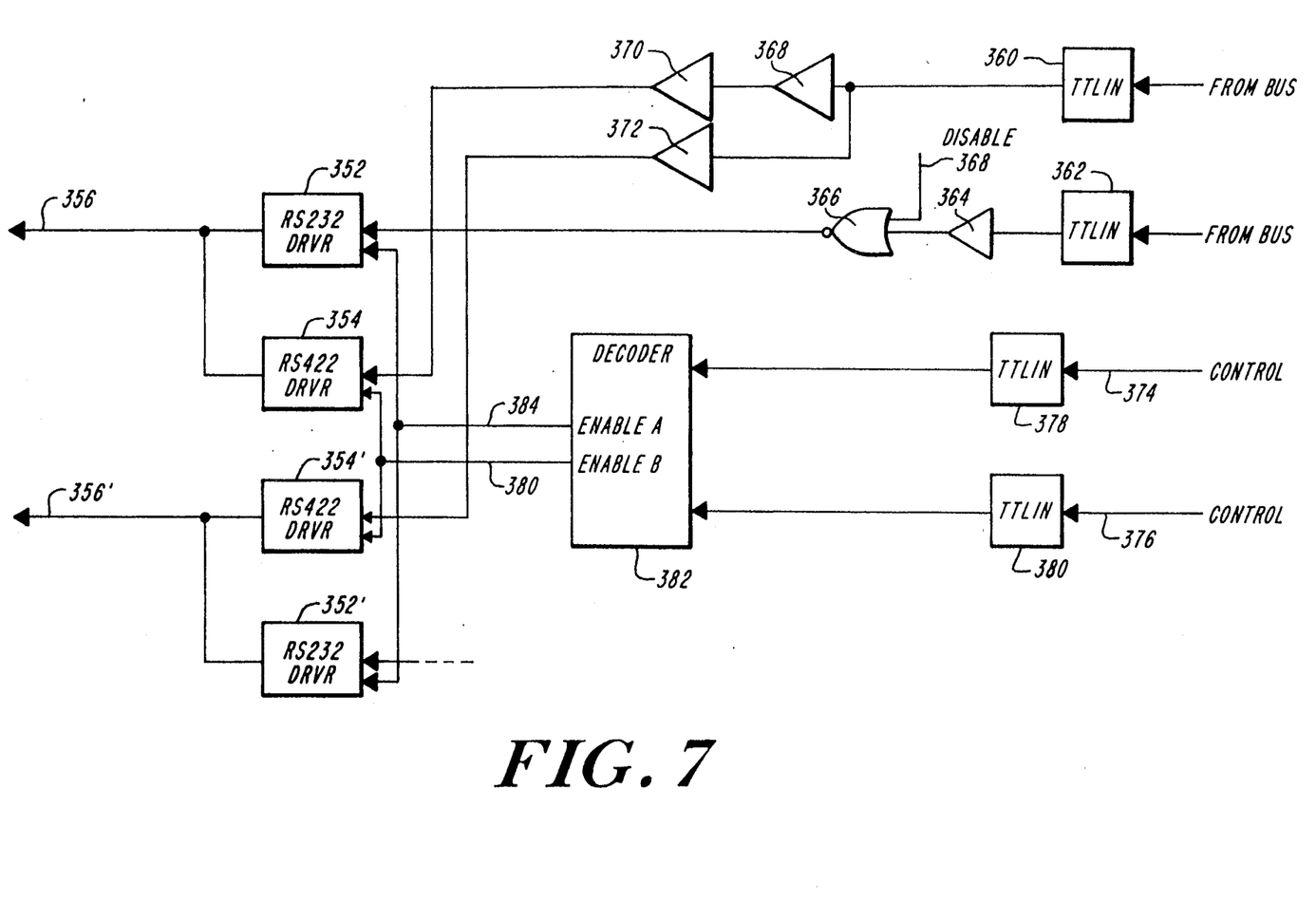
FIG. 7 is a schematic diagram of an embodiment of the combination RS232/RS422 driver shown in FIG. 6.

FIG. 7 is a schematic diagram showing, in greater detail, the signal portion of the combined RS232/RS422 interfaces shown in FIG. 6. In this embodiment, an input signal from the computer bus (not shown) enters the interface through one of two TTL receivers 360 and 362. One TTL receiver 360 provides the signal for the RS422 portion of the channel, while the other TTL receiver 362 provides the signal for the RS232 portion of the channel.

Considering the RS232 portion of the channel first, a signal from the TTL receiver 362 is inverted by inverter 364 and the inverter 364 output becomes the input to a NOR gate 366. The other input to the NOR gate 366 is a disable control line 368 which permits the RS232 portion of the channel to be switched on and off. The signal is then the input to an RS232 driver 352, whose output is connected to the common terminal 356.

A signal from the TTL receiver 360 for the RS422 portion of the channel takes two data paths. In one path, the signal is inverted twice by inverters 368 and 370 and then becomes an input to an RS422 driver 354. The output of this RS422 driver 354 is connected to the common terminal 356. Since the RS422 standard requires a differential pair, in the second data path, the signal from the TTL receiver 360 is inverted once by inverter 372 and becomes the input to a second RS422 driver 354'. This second RS422 driver 354' is shared with another combined RS232/RS422 channel. The output terminal of the second RS422 driver 354' is connected to another common terminal 356' which the RS422 driver 354' shares with the RS232 driver 352' of its channel. The two common terminals 356 and 356' provide the differential signal pair for the RS422 portion of the interface.

To select whether a signal from the RS232 or the RS422 portion of the channel is to appear at the common terminal 356, control signals 374, 376, received from the bus (not shown) by TTL receivers 378, 380, respectively, provide input signals to a decoder 382. The decoder 382 provides output signals 384, 386 which enable the RS232 drivers 352,352' and the RS422 drivers 354, 354', respectively. The decoder 383 is designed for exclusive enablement such that both the RS232 drivers 352, 352' and the RS422 drivers 354, 354' can not be enabled at the same time.

Although the embodiments of the circuits herein discussed utilize CMOS technology, equivalent devices may be fabricated using any commonly employed fabrication techniques.

It is understood that other modifications or embodiments are possible which will still be within the scope of the appended claims. These and other examples of the concept of the invention illustrated above are intended by way of example and the actual scope of the invention is to be determined solely from the following claims.

What is claimed is:

1. A voltage tripler circuit comprising a charge transfer capacitor in selective communication with a supply voltage, a first storage capacitor, and a second storage capacitor, wherein said charge transfer capacitor is first employed to generate a first voltage on said first storage capacitor which is approximately twice said supply voltage and said charge transfer capacitor employed to generate a second voltage on said second storage capacitor which is approximately triple said supply voltage.

2. A voltage multiplier comprising:
   a voltage tripler circuit comprising a charge transfer capacitor in selective communication with a supply voltage, a first storage capacitor, and a second storage capacitor wherein said charge transfer capacitor is first employed to generate a first voltage which is approximately twice said supply voltage on said first storage capacitor and said charge storage capacitor employed to generate a second voltage on said second storage capacitor which is approximately triple said supply voltage; and
   a power management circuit, wherein said power management circuit is employed to control the amount of time during which said charge transfer capacitor is coupled to said supply voltage.

3. A voltage multiplier comprising:
   a voltage tripler circuit comprising:
   power supply input terminals for providing a power supply input voltage;
   a first voltage storage capacitor;
   a second voltage storage capacitor; and
   a charge transfer capacitor in switchable communication with said first voltage storage capacitor, said second voltage storage capacitor, and said power supply input terminals,
   said charge transfer capacitor being switchably connected during first selected time periods to said power supply input terminals to charge said charge transfer capacitor to approximately said power supply voltage,
   being switchably connected during second selected time periods to one of said power supply input terminals and said first voltage storage capacitor so as to permit the charging of said first voltage storage capacitor to a first voltage approximately twice said power supply voltage, and being switchably connected to said first voltage storage capacitor and said second voltage storage capacitor so as to charge said second voltage storage capacitor to a voltage approximately three times said power supply voltage.

4. The voltage multiplier of claim 3 wherein said charge transfer capacitor is switchably connected to said power supply input terminals during first selected time periods to charge said charge transfer capacitor to approximately said power supply voltage, subsequent to being switchably connected to one of said power supply input terminals and said first voltage storage capacitor so as to permit the charging of said first voltage storage capacitor to approximately twice said power supply voltage, and prior to being switchably connected to said first voltage storage capacitor and said second voltage storage capacitor so as to charge said second voltage storage capacitor to approximately three times said power supply voltage.

5. The voltage multiplier of claim 3 further comprising:

an inverter circuit; and
an output terminal,
wherein said inverter circuit is in communication with said second voltage storage capacitor, and
wherein said inverter circuit is operative to produce an output voltage at said output terminal which is approximately equal to said voltage on said second voltage storage capacitor but with a polarity which is inverted with respect to the polarity of said voltage on said second voltage storage capacitor.

6. The voltage multiplier of claim 3 further comprising a power management circuit, said power management circuit including a variable oscillator for generating a switching rate at which said charge transfer capacitor is sequentially switchably connected to said power supply input terminals, said first voltage storage capacitor, and said second voltage storage capacitor, said switching rate being responsive to the power supplied by said voltage tripler circuit to a load in communication with said voltage tripler circuit.

7. The voltage multiplier of claim 3 wherein said charge transfer capacitor is switchably connected to said power supply input terminals during first selected time periods to charge said charge transfer capacitor to approximately said power supply voltage prior to being switchably connected to one of said power supply input terminals and said first voltage storage capacitor so as to permit the charging of said first voltage storage capacitor to approximately twice said power supply voltage.

8. The voltage multiplier of claim 3 wherein said switching rate responsive to the power supplied by the voltage tripler circuit to said load in communication with said voltage tripler circuit increases as current supplied to said load increases.

9. A voltage multiplier comprising:
a voltage tripler circuit comprising:
first and second supply voltage input terminals for providing a supply voltage;
a charge transfer capacitor having a first terminal and a second terminal;

a first switch connected between said first supply voltage input terminal and said first terminal of said charge transfer capacitor;
a second switch connected between said second terminal of said charge transfer capacitor and said second supply voltage input terminal;
a third switch connected between said second terminal of said charge transfer capacitor and said first supply voltage input terminal;
a fourth switch connected between said first terminal of said charge transfer capacitor and a first voltage storage capacitor;
a fifth switch connected between said second terminal of said charge transfer capacitor and said first voltage storage capacitor; and
a sixth switch connected between said first terminal of said charge transfer capacitor and a second voltage storage capacitor,
wherein said first and second switches are conductive simultaneously, said third and fourth switches are conductive simultaneously, and said fifth and sixth switches are conductive simultaneously,
wherein each said switches is switched in response to a four cycle clock, said first and second switches being conductive during a first and third clock cycles, said third and fourth switches being conductive during a second clock cycle, and said fifth and sixth switches being conductive during a fourth clock cycle, and
wherein said charge transfer capacitor is charged to approximately said supply voltage during said first and third clock cycles,
wherein said first voltage storage capacitor is charged to approximately twice said supply voltage during said second clock cycle and
wherein said second voltage storage capacitor is charged to approximately triple said supply voltage during said fourth clock cycle.

10. The voltage multiplier of claim 9 further comprising a power management circuit in communication with said four cycle clock, said four cycle clock having a clock rate determined by said power management circuit in response to power supplied to a load in communication with said voltage tripler circuit.

11. The voltage multiplier of claim 10 wherein said power management circuit comprises:
an oscillator in communication with said four cycle clock; and
an oscillator controller in communication with said oscillator,
said oscillator controller controlling the rate of oscillation of said oscillator in response to said power supplied to said load in communication with said voltage multiplier.

12. The voltage multiplier of claim 11 in which said oscillator comprises:
an oscillator capacitor having a first terminal and a second terminal, said first terminal of said oscillator capacitor being grounded;
a first oscillator switch in series communication between said second terminal of said oscillator capacitor and an oscillator power supply;
a second oscillator switch in series communication between said second terminal of said oscillator capacitor and said oscillator power supply;
a third oscillator switch in series communication between said second terminal of said oscillator capacitor and ground; and a fourth oscillator switch in series communication between said second terminal of said oscillator capacitor and ground;

wherein when said second oscillator switch and said fourth oscillator switch are non-conductive and said first oscillator switch and said third oscillator switch are alternately and sequentially conductive and non-conductive, said oscillator capacitor charges and discharges at a first rate and generates a first oscillator frequency, and wherein when said second oscillator switch and said fourth oscillator switch are conductive and said first oscillator switch and said third oscillator switch are alternately and sequentially conductive and non-conductive, said oscillator capacitor charges and discharges at a second rate and generates a second oscillator frequency.

13. The voltage multiplier of claim 11 in which said oscillator controller comprises a voltage comparator, having an input and an output, said input in communication with said second voltage capacitor, and said output in communication with said second oscillator switch and said fourth oscillator switch, wherein said voltage comparator causes said second oscillator switch and said fourth oscillator switch to conduct when said voltage comparator determines said voltage on said second voltage capacitor is below a predetermined value.

14. The voltage multiplier of claim 9 further comprising:
an inverter circuit; and
an output terminal,
wherein said inverter circuit is in communication with said sixth switch and in communication with said second voltage storage capacitor, said inverter circuit for producing a voltage at said output terminal which is substantially equal to said voltage on said second voltage storage capacitor and having a polarity which is inverted with respect to said voltage on said second voltage storage capacitor.

15. The voltage multiplier of claim 14 wherein said inverter circuit comprises:
an output terminal;
a inverting capacitor having a first terminal and a second terminal;
a seventh switch in series communication between said first terminal of said inverting capacitor and said sixth switch;
an eighth switch in series communication between said first terminal of said inverting capacitor and said second supply voltage input terminal;
a ninth switch in communication between said second terminal of said inverting capacitor and said second supply voltage input terminal; and
a tenth switch in communication between said output terminal and said second terminal of said inverting capacitor,
said seventh switch and said ninth switch being conductive during said first and third clock cycles, and
said eighth switch and said tenth switch being conductive during said second clock cycle.

16. A communications interface circuit comprising:
an output terminal;
a first communications driver in communication with said output terminal;
a second communications driver in communication with said output terminal;

a voltage tripler in communication with said first communications driver and second communications driver, said voltage tripler for supplying a voltage to said first communications driver and said second communications driver, said voltage tripler circuit comprising a charge transfer capacitor in selective communication with a supply voltage a first storage capacitor, and a second storage capacitor wherein said charge transfer capacitor is first employed to generate a first voltage which is approximately twice said supply voltage on said first storage capacitor and wherein said charge transfer capacitor is employed to generate a second voltage which is approximately triple said supply voltage on said second storage capacitor;

an oscillator in communication with said voltage tripler, said oscillator for controlling said second voltage supplied by said voltage tripler; and an oscillator controller in communication with said oscillator and in communication with said voltage tripler, said oscillator controller for causing said oscillator to oscillate at a first frequency when said second voltage supplied by said voltage tripler exceeds a first predetermined value and for causing said oscillator to oscillate at a second frequency when said second voltage supplied by said voltage tripler is below a second predetermined voltage.

17. A method of voltage tripling using a charge transfer capacitor having first and second connections comprising the steps of:
switchably connecting said first and second charge transfer capacitor connections to respective first and second power supply input terminals providing a power supply input voltage;
charging said charge transfer capacitor approximately to said power supply input voltage;
switchably connecting said second charge transfer capacitor connection to said first power supply input terminal to provide a voltage equal to approximately two times said power supply input voltage on said first charge transfer capacitor connection;
switchably connecting a first connection of a first voltage storage capacitor to said first connection of said charge transfer capacitor and switchably connecting a second connection of said first voltage storage capacitor to said second power supply input terminal to charge said first voltage storage capacitor to approximately two times said power supply voltage;
switchably connecting said second connection of said charge transfer capacitor to said first connection of said first voltage storage capacitor to provide a voltage equal to approximately three times said power supply input voltage on said first connection of said charge transfer capacitor; and
switchably connecting a first connection of a second voltage storage capacitor to said first connection of said charge transfer capacitor and switchably connecting a second connection of said second voltage storage capacitor to said second power supply input terminal to charge said second voltage storage capacitor to approximately three times said power supply voltage.

18. A voltage tripler circuit comprising:
power supply input terminals for connection to a power supply input voltage;
a first voltage storage capacitor;

a second voltage storage capacitor; and a charge transfer capacitor in switchable communication with said first voltage storage capacitor, said second voltage storage capacitor, and said power supply input terminals, said charge transfer capacitor being switchably connected across said power supply input terminals at selected times to charge said charge transfer capacitor to approximately said power supply voltage, being switchably connected between one of said power supply input terminals and said first voltage storage capacitor so as to produce a voltage on said first voltage storage capacitor of approximately twice said power supply voltage, and being switchably connected between said first voltage storage capacitor and said second voltage storage capacitor so as to produce a voltage on said second voltage storage capacitor of approximately three times said power supply voltage.

19. The voltage tripler circuit of claim 20 wherein said charge transfer capacitor is switchably connected across said power supply input terminals at selected times to charge said charge transfer capacitor to said power supply voltage, subsequent to being switchably connected between one of said power supply input terminals and said first voltage storage capacitor so as to produce a voltage on said first voltage storage capacitor of approximately twice said power supply voltage, and prior to being switchably connected between said first voltage storage capacitor and said second voltage storage capacitor to produce a voltage on said second voltage storage capacitor to approximately three times said power supply voltage.

* * * * *